No. 836,084. PATENTED NOV. 20, 1906.
E. F. BRADLEY.
BRAKE FOR VEHICLES.
APPLICATION FILED DEC. 27, 1904.
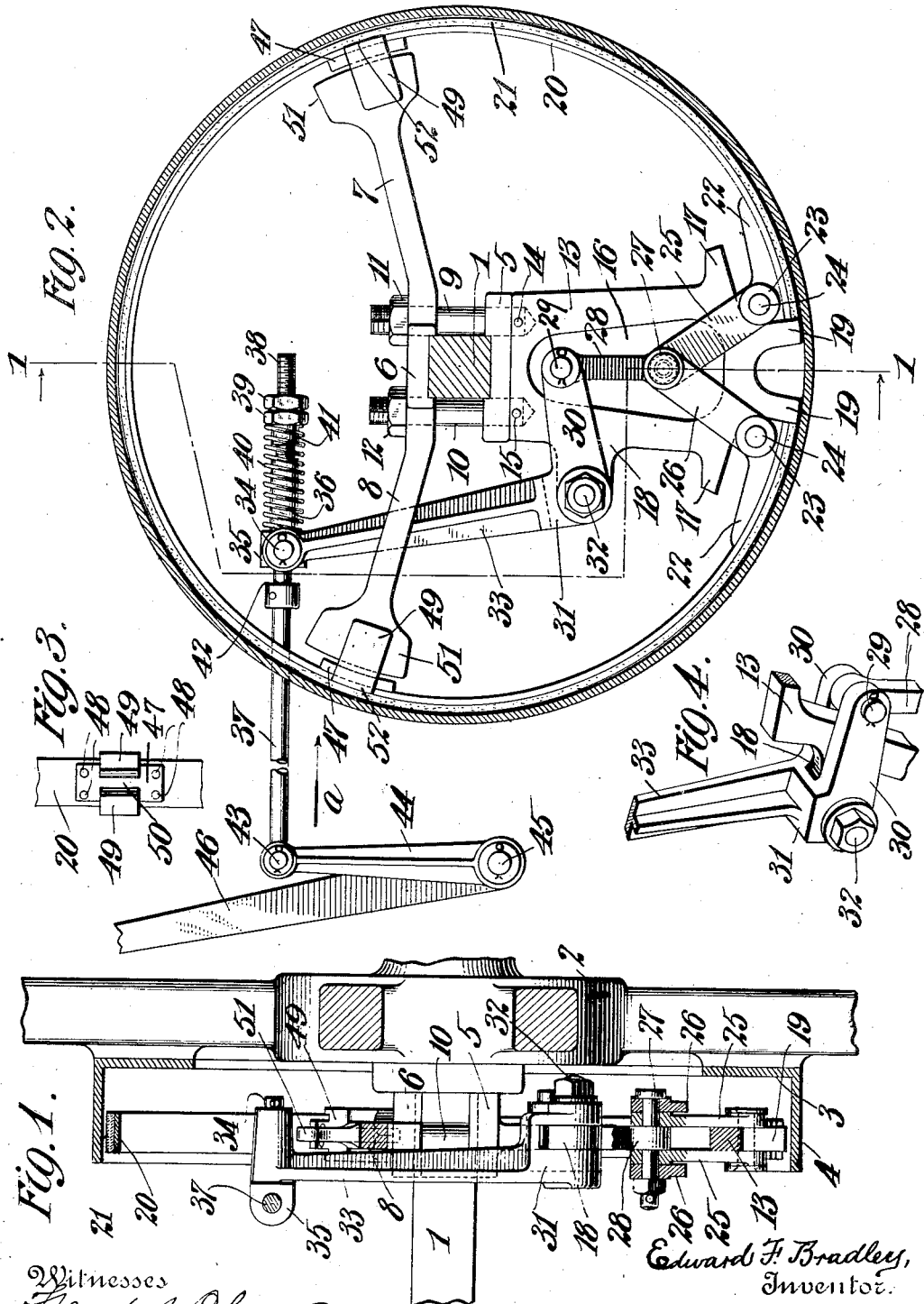
Witnesses
Frank S. Ober.
M. Herskovitz.
Edward F. Bradley,
Inventor.
By his Attorney
Chas. McC. Chapman.

UNITED STATES PATENT OFFICE.

EDWARD F. BRADLEY, OF TUFNELL PARK, LONDON, ENGLAND, ASSIGNOR TO BERNARD F. BRADLEY, OF NEW YORK, N. Y.

BRAKE FOR VEHICLES.

No. 836,084.   Specification of Letters Patent.   Patented Nov. 20, 1906.

Application filed December 27, 1904. Serial No. 238,436.

*To all whom it may concern:*

Be it known that I, EDWARD FRANKLIN BRADLEY, a citizen of the United States, residing in Tufnell Park, London, N., England, have invented a new and useful Improvement in Brakes for Vehicles, of which the following is a description.

This invention relates to brakes for vehicles of all kinds, and particularly to the class of brakes falling under the general description of "friction-brakes" and which are caused to expand radially.

It is an object of this invention to provide a brake for vehicles of all kinds which will be positive, powerful, and certain in its action and by medium of which a maximum amount of friction can be applied with a minimum amount of actuating force and movement.

Other objects of this invention are to provide a brake mechanism which is compact and simple in structure and which has few parts so arranged and disposed that the power for expanding the brake-band into action can be applied equally in opposite directions; to produce a brake mechanism in which the expanding member can be returned to and held in a concentric inoperative position when released and there maintained when not in operation in a manner to avoid the noise and rattling of parts such as is common in existing forms now on the market; to provide a brake mechanism which will be equally effective in both directions of movement of the vehicle; to provide a brake mechanism which can be applied to any vehicle without the necessity for altering or materially modifying any of the parts of either the brake or vehicle and which is easy of application and removal, and to provide a brake mechanism of simple parts and the coöperation of which parts enables powerful pressure to be applied instantly and maintained with a high degree of certainty and efficiency.

Other objects will appear during the course of this description, and with the same in view, together with those above noted, this invention consists in the parts, features, elements, and combinations hereinafter described and claimed.

In the drawings which form part of this description, Figure 1 is an elevation of a portion of a vehicle-wheel and its axle, showing the application of the brake mechanism thereto, portions of the latter and of the wheel being in section and the section being on the line 1 1 of Fig. 2. Fig. 2 is a side elevation of the brake mechanism, the axle of the vehicle and the brake-ring being shown in section and the brake-actuating mechanism being only partially shown. Fig. 3 is a detail view showing the means for holding the brake-band from lateral movement, and Fig. 4 is a detail view showing the construction of the brake-lever and adjacent parts, as hereinafter described.

Primarily it is to be understood that in this application I have disclosed what I deem to be at the present time the best embodiment of my invention; but I wish it distinctly understood that within the scope and principle of the broad idea of means involved there may be many modifications made in details which are within the skill of any mechanic and which may be necessitated by the application of my brake mechanism to vehicles of different kinds or styles.

In the drawings I have shown a dead axle, which is indicated by 1 and on the end of which the wheel 2 freely turns, only the hub and spokes or web portions of the wheel being shown. Further details of these parts have not been illustrated, because the same are not of importance to my invention and are deemed to be not necessary to an exposition of the latter; but it is to be distinctly understood that though I have illustrated a dead axle and wheel running thereon my invention is applicable to vehicles employing a live axle.

My brake mechanism consists, essentially, of the brake-ring 3, having the rim or flange 4, the ring in the instance shown being formed, cast, or otherwise rigidly secured to the webs or spokes of the wheel 2; but it will be understood and obvious to any one skilled in the art that this brake-ring 3 may be formed separately from the traction-wheel 2 and applied to the latter by means of bolts passing through the ring 3 and the webs or spokes of the wheel 2. The inner surface of the rim 4 is uniform, and this rim constitutes one of the brake members.

The numeral 5 indicates one portion of a bracket, which is applied to the bottom of the axle 1, the opposing member of the said bracket consisting of the part 6, applied to the opposite side of the axle 1 and having the oppositely-extended or radial arms 7 and 8. The portions 5 and 6 are rigidly clamped to the axle 1 by means of the bolts 9 and 10 extending through the said portions 5 and 6 and securely holding the latter to the axle by means of the nuts 11 and 12, applied, respectively, to the screw-threaded ends of said bolts. The opposite ends of said bolts are tapped into the depending support 13 and there respectively permanently held by rivets 14 and 15 or by any other suitable means. The depending support is thus held rigidly in the position shown and is provided with the elongated slot 16, oppositely-extending lugs 17, the arm 18, and the abutments 19. The brake-band, constituting the other brake member, is indicated by 20 and is made of spring metal or other suitable strong and durable material and has applied to its external surface a piece of durable frictional material 21, such as "gandy belting." This brake-band 20 is in the form of a split ring, is of uniform diameter from end to end and smaller than the brake-ring, and is so constructed as to have considerable tensile strength—that is to say, the ends of the band will be normally separated, and the band will fit and rest in place substantially as shown in Fig. 2. At its free ends the brake-band 20 has applied and rigidly held thereto in any suitable manner the shoes 22, which at adjacent ends are provided with tubular bearings 23, and each of which bearings receives a pivotal pin 24, affording the pivotal connection between the said brake-band and the pairs of links 25 and 26, respectively. These pairs of links at their upper ends are pivotally connected by means of the journal-pin 27, which also connects the said links to the link 28, the upper end of which is pivotally connected at 29 between the forks 30 of the bifurcated end of the bell-crank lever 31, which latter is pivoted, by means of the pin 32, to the arm 18 of the depending support 13, which latter is embraced by the forks 30 or, in other words, stands within the bifurcation of the bell-crank lever 31. From the description thus far it is obvious that the pairs of links 25 and 26 embrace the depending support 13 and that the link 28 operates within the elongated slot 16 of said support. Nuts, washers, or other holding means may be applied to the respective pivotal pins 24, 27, 29, and 32 for the purpose of retaining the various parts. The other arm 33 of the bell-crank lever is ribbed for strength and at its upper end is pivotally connected by the pin 34 to the enlarged end 35 of the sleeve 36, which freely slides upon the connecting-rod 37, the latter at its free end being screw-threaded at 38 and having applied thereto a set of holding and jam nuts 39, against one of which one end of the spring 40 engages and the opposite end of which spring engages the enlarged portion 35 of the sleeve 36. A short sleeve 41 is placed upon the screw-threaded end 38 of the rod and may be attached in any suitable manner to the inner one of the nuts 39, so as to move therewith. The coiled expansion-spring 40 surrounds the sleeves 36 and 41 and by them is prevented from contact with the screw-threads of the rod 37, thus avoiding the wearing down of said screw-threads and also avoiding interference between the rod and spring. The normal tendency of the spring, which is very stiff and strong, is to force the arm 33 of the bell-crank lever away from the free end of the rod, and thus lift the bifurcated arm of the lever and in consequence the toggle-links. This will be further explained in the mode of operation of the mechanism. A collar 42 is fixed in any suitable manner upon the rod 37 at a point such that there will be always a clearance in the normal or inoperative position of the brake mechanism between said collar and the enlarged end 35 of the sleeve 36. At its opposite end the rod 37 is pivoted at 43 to the upper end of the short arm 44 of the actuating-lever, which is pivoted at 45 to the body of the vehicle, as is usual, and the long arm 46 of which lever is, as usual, provided with the hand-grip for actuating the brake mechanism. It will be understood that the body of the vehicle, to which the actuating-lever 44–46 is pivoted, has movement relatively to the brake mechanism—that is to say, the body of the vehicle, as is usual, rests and has movement upon springs, while the brake mechanism, connected to one or more of the traction-wheels, is stationary relatively to the vehicle-body and actuating-lever pivoted thereto in so far as vehicle movements are concerned. In other words, the actuating-lever 44–46 has and must be allowed a certain amount of movement relatively to the brake mechanism and especially the brake-lever 31. This will be further explained in the description of the mode of operation.

To prevent any lateral movement of the brake-band 20 relatively to the brake ring or flange 4, said band is provided at opposite points with confining devices, the same consisting of the plate 47, secured by several rivets 48 or other suitable means to the brake-band 20, the said plate 47 being provided with separated lugs or extending arms 49, the inner walls of which are caused to converge from the outer ends of the lugs to the surface of the plate 47, thus producing the substantially V-shaped recesses 50 between the lugs for the reception of the enlarged ends 51 of the oppositely-extended arms 7 and 8 of the bracket-piece 6, the said enlarged ends being made to conform in a measure to the shape of the recess 50. The parts of these confining devices obviously may be cast in one piece; but it is not intended to limit this invention to such construction, and the lugs 49 may be lined or faced with gandy-belt, leather, or other material calculated to deaden the contact of ends 51. Furthermore, irrespective of the manner in which the parts are made and secured to the brake-band the lugs 49 will be extended beyond the bottom of the plate 47 to an extent equal to the thickness of the brake-band 20, as shown at 52, Fig. 2, and will be caused to closely embrace the sides of said brake-band, and thus provide an additional means for securing the confining devices to the brake-band and preventing any relative movement between the two, thus also adding strength to the structure.

The details of the brake mechanism having been described, the mode of operation will now be set forth, together with the advantages and functions of the structural features. As shown in Figs. 1 and 2 of the drawings, the brake mechanism is in its normal or inoperative position with the two brake members separated—viz., the brake-band 20 being out of contact with the brake ring or flange 4 and the free ends of said brake-band being in engagement with the abutments 19 of the depending support 13 and the journal-bearings of the shoes 22 being in engagement with the lugs 17, the toggle-links being thus held in elevated position and the lever 31 thrown back, as shown. The actuating-lever 44–46 being pivoted to the body of the vehicle and rigidly held in the position shown by the usual retaining-rack, the spring 40 will be under compression between the head 35 of the sleeve 36 and the jam and holding nuts 39 on the rod 37. The spring being thus under compression and the rod 37 being thus held from longitudinal movement, the upper end of the bell-crank lever 31 is thus held yieldingly in the position shown, the said spring 40 constituting the means for holding the brake-lever 31 and the toggle-links from having any movements which would cause them to rattle or assume a position such that they would not be in condition to promptly and directly apply power to the brake-band. If now movement be imparted to the actuating-lever 44–46, by grasping the upper end of the arm 46 to drive the rod 37 in the direction of the arrow $a$ said rod will be instantly moved through the sleeve 36 and the spring 40 will expand, and thus momentarily hold the upper end of the arm 33 substantially in the position shown in Fig. 2 notwithstanding the movement of the rod 37 relatively thereto. This condition will exist until the collar 42 is brought into contact with the enlarged end 35 of the sleeve 36, when the lever 31 will be instantly and positively turned on its pivot and power will be applied to the link 28 and to the links 25 and 26. The power being thus applied directly at the fulcrum or joint of the links 25 and 26 and along the longitudinal axis or length of link 28, the said links 25 and 26 will be caused to expand equally in opposite directions and will thus drive the free ends of the brake-band 20 equally and uniformly away from the abutments 19, from the lugs 17, and into contact with the brake ring or flange 4. This application of power in the manner just described will cause the instant and equal expansion of the brake-band 20 throughout its length into contact with the brake-ring, thus uniformly and powerfully creating friction between the two brake members. It will be obvious that this action will occur irrespective of the direction of movement of the vehicle or of the wheels and that the same movement of the actuating-lever 44–46 and of the brake-lever 31 will with equal efficiency and power apply the brake-band to the brake-ring irrespective of the direction of movement of the vehicle. It will be realized from the illustration of my invention and the description above given that comparatively little power applied to and comparatively little movement of the actuating-lever 44–46 are necessary to set the brake mechanism into action and that when once started into operation the action is cumulative, and consequently comparatively little power is needed to hold the brake mechanism to its work. Moreover, to separate the friction members little or no manual power is required, inasmuch as the normal strong tendency of the spring 40 to expand and the length of the arm 33 of the brake-lever are powerful factors in forcing the toggle links and lever 31 into normal position and materially aid in and are, in fact, sufficient for the purpose of separating the brake members after the lever 44–46 has been released, and this means, which normally tends to separate the brake members 20 and 4, also constitutes the means which prevents rattling of and between the parts by properly holding them stiff and in normal position, for as the brake-band 20 is released from the brake-rim 4 the ends of the brake-band are instantly lifted and drawn into engagement with the abutments 19 and the journal portions of the shoes 22 instantly engage the bottom of the lugs 17, the lugs and abutments thus limiting the movement of the brake-band and preventing the ends of the brake-band from assuming a position which might render the device ineffective under certain conditions, and said lugs and abutments thus coöperating with the spring 40 maintain the brake-band 20, the toggle-links, and the lever 31 in the normal inoperative position, but ready for instant effective operation. (Shown in Fig. 2.)

From the above description it will be seen that the brake-band 20 is entirely free from and independent of the axle 1, the brake-ring 4, and all of the rigid parts of the brake mechanism, said brake-band being thus, in effect, what may be termed a "floating" brake member, for the power of the spring 40 is such as to cause the ends of the brake-band to have a normal tendency to contract and coil within its circumference, thus enabling its said ends to tightly engage the respective abutments and lugs 19 and 17. This normal tendency of the ends of the band 20 to contract results in freeing the ends of the latter from the brake-ring and in firmly holding the band when its ends are engaged with the lugs and abutments in the position shown in Fig. 2 with an inherent power and readiness to do work—that is to say, when the brake-band has been placed in position, as in Fig. 2, the force and strength of spring 40 enable it to so remain until sufficient power is applied to force it into contact with the brake-ring, and such force and power are also sufficient to prevent its ends rattling on adjacent parts and to enable said band to maintain and support the weight of its connected brake mechanism, which in turn prevents looseness and rattling of parts. Thus by the mere agency of the spring 40 the brake-band 20 is maintained in the position of Fig. 2—inoperative, but ready to do work—without the aid of positive external support. However, during the operation and travel of the vehicle over rough roads violent vibration and jarring of parts may occur, which would probably while the brake-band is inoperative tend to cause its gradual movement until its body portion were moved laterally into contact with the back of the brake-wheel 3, or sufficiently beyond the outer edge of the rim of the latter to be entirely displaced or become ineffective for braking purposes. To overcome these possible tendencies and objectionable occurrences, I have provided the duplex structure of the toggle mechanism—that is to say, as shown in Fig. 1, the links 25 and 26 are arranged in pairs and to embrace the depending support 13 at the bottom thereof, thus preventing the free ends of the brake-band from having any lateral movement caused by the jarring of the vehicle or otherwise. In addition the restraining devices which engage the enlarged ends 51 of the arms 7 and 8 prevent the body of the brake-band from having any lateral movement relatively to the brake-ring, and by converging the slots or spaces 50 between the lugs or arms 49, so as to enable the latter to engage the ends 51 snugly, excessive and objectionable movements of the brake-band as a whole toward the rim of the brake-ring or wheel are prevented and especially while the brake-band is out of operation and when it is not desired to apply the brake. The ends 51 of the arms 7 and 8 never bottom in the space 50, and therefore while I have provided means by which the brake-band may be supported should the occasion or contingency arise it will be clear that under normal conditions said band is without positive external support, being in consequence virtually a floating member. Furthermore, it will be seen from the description that the actuating mechanism is also independent of the axle and of the coöperating parts of the brake mechanism and has loose sliding connection with the latter. These several elements of construction and their accompanying functions are distinctive of my brake mechanism and are important features of my invention in that they produce a simple, powerful, and effective brake for all kinds of heavy and light vehicles and one which is easily assembled or taken apart, easily and quickly operated, which will stand great wear and tear, and which requires but a minimum of force or movements to obtain a maximum of power and effective action.

Another important feature of my invenmechanism is the yielding connection between the brake-lever 31 and the actuating-rod 37, and the function resulting from this construction is quite important, for it must be borne in mind that the vehicle-body, to which the actuating-lever 44-46 is pivoted, has considerable "spring" or movement relatively to the wheels and axle, which may be manifested when weight is added to the said body or the vehicle is traveling over rough roads. When such movement occurs, the loose and yielding connection between the arm 33 and the rod 37 permits the two to have considerable play and yield relatively, thus preventing the spring of the vehicle from affecting the rod or the brake mechanism, and the spring 40 takes up and absorbs the movement of the rod 37, prevents the latter from moving the lever 31, prevents rattling, looseness, strain or jamming of the parts, and maintains the parts in their proper relation undisturbed.

From the above description of the operation of the brake mechanism and the coöperation of the several parts thereof for the functions and purposes noted the following advantages and important features of my invention will be understood, and upon them it is desired to lay stress, viz: When the brake-band 20 is moved into action, every portion of its surface is instantly applied to the ring or flange 4, said brake-band fitting tightly and snugly against said ring and applying in consequence a powerful frictional pressure. The brake-band 20 is expanded into action in contradistinction to being contracted into action, and this feature of the brake mechanism enables the friction-surfaces to be housed or covered, thus preventing the collection of grit or dirt and the consequent wear of the parts. The disposition of the parts is such as to render access easy and convenient for purposes of adjustment and repair, and the few simple parts are so combined as to render it practically impossible for faults or disorder to occur during use, and the provision of the means for preventing rattling of the parts eliminates noise. In point of functions stress should be laid upon the fact that from constant use the gandy-belt may wear away and also the brake-band 20 and to such an extent that the thinnest rim may be left without destroying its expansive quality, and thus the brake-band will still perform its work effectively, and whatever wear takes place occurs equally throughout the entire friction-surfaces, the brake-band 20 thus automatically compensating for wear on the braking-surfaces. Again, when the brake-band 20 has been released from its work it instantly and automatically returns to a concentric inoperative position, with its ends closely and forcibly hugging or bearing against the abutments 19 and lugs 17, where said ends are maintained tightly both by the strength of the band 20 and the expansive force of the spring 40, which latter operates upon the adjacent nut 39 and the enlarged head 35 of the sleeve 36, thus holding the brake-lever 31 and the toggle-links firmly in the inoperative position, (shown in Fig. 2,) the actuating-lever 44–46 being presumed to have become locked in its inoperative position and the spring 40 to be under compression, the rod 37 being thus held in substantially a horizontal position and maintained in proper position by the upper end of the short arm 44 of the actuating-lever and the upper end of the long arm 33 of the brake-lever.

It will now be quite clear that I have produced a form of brake mechanism which is applicable to any and every kind of vehicle and one which is easily operated, is powerful in its action, is simple in structure, and is durable. It may be added that in operation this brake has been found to apply its force instantly and effectively and that its application can be made with such rapidity and force as to cause the wheels to skid.

Having thus described my invention, what I claim, and desire to secure by Letters Patent, is—

1. A brake mechanism comprising a plurality of friction members normally out of contact with each other, means for bodily moving one of said members into contact with the other, and stationary means coöperating with adjacent portions of said movable member so as to form an abutment for controlling the position of the same.

2. A brake mechanism comprising two friction members, one of the said members consisting of a split ring and being movable relatively to the other, means for bodily actuating said movable member into contact with the other, and elastic means included in the actuating means for preventing rattling of said movable member when in its normal or inoperative position.

3. A brake mechanism comprising two friction members, one of said members being movable relatively to the other, means for bodily actuating the movable member into contact with the other, including means for supporting the movable member in an inoperative position, and elastic means included in the actuating mechanism for preventing rattling of said member when in such position.

4. A brake mechanism comprising a brake-wheel; a brake member consisting of a split ring normally out of contact with the brake-wheel; means for forcing said ring bodily into engagement with said wheel comprising a lever and a connection pivoted thereto and to said ring; and independent means coöperating with the ends of said ring for controlling the position of the latter.

5. A brake mechanism comprising a brake wheel; a brake member consisting of a split ring normally out of contact with the brake-wheel; stationary means interposed between the ends of said ring for controlling the position of the latter; and means for forcing said ring bodily into engagement with said wheel.

6. A brake mechanism comprising a brake-wheel; a brake member consisting of a split ring normally out of contact with the brake-wheel; stationary means entirely within the circumference of said wheel coöperating with the ends, and for maintaining the normal position, of the said ring; and means for forcing said ring bodily into engagement with said wheel.

7. A brake mechanism comprising a brake-wheel; a split brake-ring contained in said wheel but normally out of contact therewith; a fixed abutment interposed between the ends of said ring to control the position thereof; and means pivotally connected to said abutment and to said ring for bodily actuating the latter for creating friction between the said wheel and ring.

8. A brake mechanism having in combination a brake-wheel; a resilient split ring encompassed by said wheel; means for creating contact between the wheel and ring, a portion of which is located within the wheel; brake-actuating mechanism carried by a rigid support; and a yielding connection between the actuating mechanism and the contact-creating means permitting said mechanism and means to have relative movements, whereby when the actuating mechanism is set the said means will not be disturbed by the relative movement of the latter and said mechanism.

9. A brake mechanism having in combination a brake-wheel; a resilient split ring encompassed by said wheel; and a train of mechanism for creating contact between the members, including a lever located within the wheel, an actuating device located outside the wheel, and a yielding connection between said device and lever permitting relative movement between the two, whereby strain from the actuating device will not be transmitted to the lever while the brake mechanism is in an inoperative position.

10. A brake mechanism having in combination a brake-wheel; a resilient split ring encompassed by said wheel; and a train of mechanism for creating contact between the members, said train of mechanism including an actuating device, means within the wheel for causing contact of said members, and a yielding connection between said device and means permitting relative movement between the two, whereby relative movement of said device and means may be had without disturbing the brake members.

11. A brake mechanism comprising a brake-wheel; a resilient split ring for creating friction on said wheel; an abutment suitably supported and having a portion extending between the ends of the ring; means carried by the extending portion for controlling the position of said ends; and means, including a lever and a connection pivoted thereto and to said ring for b lily actuating the latter for creating friction between the wheel and ring.

12. A brake mechanism comprising a brake-wheel; a split ring for creating friction on said wheel; an abutment suitably supported and having a cross-bar extending in opposite direction to a position adjacent the ring; means on the ring for engagement with said bar to prevent lateral movement and rattling of the ring; and means for creating friction between the wheel and ring.

13. A brake mechanism comprising a brake-wheel; a split floating brake member; stationary means coöperating with adjacent free portions of said member for limiting the movement of the latter; and means for driving said member bodily against said brake-wheel to create friction.

14. A brake mechanism comprising a brake-wheel; a floating, split brake member; stationary means coöperating with adjacent free portions of said member for limiting the movement of the latter; and means for driving said member bodily against said brake-wheel by the application of power to its said free portions.

15. A brake mechanism comprising two friction members one of which is made of spring metal, means for sustaining the spring member normally free from and out of contact with the other member, stationary means coöperating with adjacent portions of one of said members for positively positioning and maintaining it in its normal position, and actuating mechanism for driving the spring member bodily into contact with the other member.

16. A brake mechanism comprising two friction members, mechanism for actuating one of said members bodily into contact with the other, a portion of such actuating mechanism being located within and a portion outside the scope of said friction member, and said former portion having a cushion device coöperating therewith to prevent rattling of the parts and to normally hold the latter in an inoperative position.

17. A brake mechanism having in combination a brake-wheel; a resilient split ring encompassed by said wheel; mechanism for actuating one of said members bodily into contact with the other located within said wheel; a manually-operated means for actuating said mechanism; and an elastic device included in said actuating mechanism for coöperating with said means for controlling the elements of both thereof when the same are in an inoperative position.

18. A brake mechanism comprising a brake-wheel; a resilient split ring normally held out of contact with the brake-wheel; a rigid abutment extending between the ends of said ring for holding said ends in an inoperative position; and means operating upon the ring in two directions for expanding the same and forcing it bodily into engagement with said wheel.

19. A brake mechanism comprising a brake-wheel; a brake member consisting of a split ring normally held out of contact with the brake-wheel; an abutment coöperating with the ends of the ring; means for preventing lateral movement of the ring relatively to the wheel; and means operating upon the ring in two directions for forcing the same bodily into engagement with said wheel.

20. A brake mechanism comprising a brake-wheel; a spring, split ring normally held out of contact with the brake-wheel; means coöperating with the ends of said ring for determining and maintaining the normal inoperative position thereof; and means for forcing said ring bodily into engagement with said wheel comprising a lever and a connection pivoted thereto and to said ring.

21. A brake mechanism comprising a brake-wheel; a brake member normally held out of contact with the brake-wheel; means for maintaining said member in an inoperative position and for controlling the position thereof coöperating with its ends; and means for forcing said member bodily into engagement with said wheel comprising a lever and a connection pivoted thereto and to said ring, the said member and the said controlling means both being within the circumference of said wheel.

22. A brake mechanism comprising a brake-wheel, a resilient, split brake-ring contained in said wheel; means pivotally connected to the ends of said brake-ring for aiding in holding the latter normally out of contact with said wheel; means interposed between the ends of said ring for limiting the movement of the latter; and a lever mechanism, including the ring-holding means, for bodily actuating the ring for creating friction between the wheel and ring.

23. A brake mechanism comprising a brake-wheel and a resilient split ring constituting brake members; means for bodily moving said members relatively to create friction between the same; said means including a cushion device, located within the circumference of the brake members, which also has the function of aiding in holding one of the members normally out of contact with the other.

24. A brake mechanism comprising a brake-wheel and a single resilient split ring constituting brake members; and means for bodily moving one of said members into contact with the other, including a spring which coöperates with elements of said means so the latter may also normally hold the brake members separated.

25. In combination two brake members; means for creating friction between the brake members, said means including a toggle device, an actuating device therefor, and a spring for controlling the normal position of said device; and means coöperating with the toggle device for preventing lateral displacement of the two brake members.

26. In combination two friction members; means for driving one into contact with the other, including a bell-crank lever and duplex toggle device; means embraced by said toggle device for holding the latter from lateral displacement; and means for actuating the bell-crank lever.

In testimony whereof I have hereunto signed my name in the presence of two subscribing witnesses.

EDWARD F. BRADLEY.

Witnesses:
CHAS. McC. CHAPMAN,
M. HERSKOVITZ.